United States Patent [19]
Bonko et al.

[11] Patent Number: 5,509,456
[45] Date of Patent: Apr. 23, 1996

[54] INFLATION APPARATUS FOR TUBELESS TIRE

[75] Inventors: Mark L. Bonko, Uniontown; Loran C. Lopp, Jr., Wadsworth, both of Ohio; Sandy Ochoa, Alamagordo, N.M.

[73] Assignee: The Goodyear Tire & Rubber Company, Akron, Ohio

[21] Appl. No.: 229,474

[22] Filed: Apr. 18, 1994

[51] Int. Cl.$^6$ .................................................. B60C 25/00
[52] U.S. Cl. ...................................................... 157/1; 157/1.1
[58] Field of Search ........................................ 157/1.0, 1.1

[56] References Cited

U.S. PATENT DOCUMENTS

| | | | |
|---|---|---|---|
| 3,675,705 | 7/1972 | Corless | 157/1.1 |
| 3,677,320 | 7/1972 | Corless | 157/1.1 |
| 3,736,975 | 6/1973 | Strang et al. | 157/1.1 |
| 3,789,901 | 2/1974 | Rishovd | 157/1.1 |
| 3,814,163 | 6/1974 | Charles et al. | 157/1.1 |
| 3,866,654 | 2/1975 | Duquesne | 157/1.1 |
| 3,937,264 | 2/1976 | Mikovits et al. | 157/1.1 |
| 4,263,958 | 4/1981 | Corless | 157/1.1 |
| 5,042,547 | 8/1991 | Van De Sype | 157/1.1 |
| 5,072,764 | 12/1991 | Ochoa | 157/1.1 |
| 5,247,982 | 9/1993 | Miller | 157/1.1 |

*Primary Examiner*—D. S. Meislin
*Attorney, Agent, or Firm*—David L. King; Roger Emerson

[57] ABSTRACT

An apparatus (10) for inflating larger tubeless tires (80), such as those utilized on farm tractors, includes a segmented manifold (104) which is expandable radially to accommodate different sizes of tires. The segmented manifold (104) includes outlet holes (36) from which pressurized gas may exit to inflate the tire (80). The holes (36) have centerlines which make angles generally between 40° and 75° with a plane containing the manifold (104). The angled holes (36) direct the pressurized gases exiting the manifold in optimum directions to expand the tire sidewall against the wheel flange (92) to assist in sealing the tire beads against the wheel (82).

19 Claims, 9 Drawing Sheets

INFLATION APPARATUS FOR TUBELESS TIRE

BACKGROUND OF THE INVENTION

To inflate a tubeless tire on a wheel, the bead area of the tire must seal against the wheel flange. Depending on the type and size of tire, this process can be difficult. In larger tubeless tires, such as those used on farm vehicles such as tractors, inflating the tire on the vehicle wheel has been especially difficult. Sidewalls of such farm tires may be stiff and distorted, making it difficult to expand the sidewalls of the tire outwardly to make contact between the bead and the wheel flange.

A problem encountered in the prior art is the amount and flow rate of air necessary to seal the tire beads on the wheel. In the past, small volumes of high pressure air were used to quickly fill the interior of the tire so that the tire beads sealed outwardly against the wheel flange. As new larger cross-section tubeless tires became available, pressuring these larger tire cavities with this combination of small volume/high pressure air became very difficult to accomplish. Advantages would be obtainable if larger volumes of pressurized air could be utilized.

The present invention contemplates a new and improved apparatus and method of inflating such tubeless tires which is simple in design, effective in use and overcomes the foregoing difficulties and others while providing better and more advantageous overall results.

SUMMARY OF THE INVENTION

An apparatus for inflating tubeless tires on a wheel is disclosed. The apparatus includes a first manifold for passing pressurized gas therethrough. The manifold includes annular segments which are selectively moveable outwardly to fit tires of different diameters. The manifold includes an inlet and a plurality of outlets, one of the outlets having a centerline making an angle between 35° and 75° with a plane containing the manifold. The manifold further comprises an exit injection cross-sectional area and an inlet injection cross-sectional area. The exit injection cross-sectional area being between 0.75 to 1.65 times the inlet injection cross-sectional area.

According to a further aspect of the invention, an apparatus includes a first annular manifold generally lying in a first center plane, an inlet, and a plurality of outlets. One of the outlets has a centerline making an angle between 40° and 75° with the first center plane. The apparatus further includes a second annular manifold which is concentrically outward of the first annular manifold and which generally lies in a second center plane and plurality of outlets. One of the outlets in the second annular manifold has a centerline making an angle between 35° and 65° with the second center plane. The apparatus further includes a third annular manifold which is concentrically outward of the first and second annular manifolds. The third annular manifold generally lies in a third center plane and a plurality of outlets. One of the outlets of the third annular manifold has a centerline making an angle between 35° and 55° with the third center plane. The outlets are configured into rows of holes. The apparatus further includes a frame which is attached to the manifolds and a support member which is connected to the first and second manifolds and which positions the second manifold a certain distance away from the frame. The apparatus further includes a centering block which connected to the frame and the first annular manifold and which positions are centered the first annular manifold relative to an associated tire so that the axis of the first annular manifold is aligned with the axis of the associated tire.

According to a further aspect of the invention, a method of inflating a tubeless tire, the tire having a nominal bead diameter between 24 inches and 54 inches, comprises the steps of mounting an inflated tire onto a wheel; centering an inflation apparatus against lateral flange of the wheel; inflating the tire with a surge of pressurized gas through an inflation apparatus, the inflation apparatus comprising a first annular manifold to seal beads of the tire against the wheel, the annular manifold having outlet holes therein, the centerlines of the holes making an angle between 35° and 75° with a plane containing the first annular manifold; and, inflating the tire to operating pressure through a tire valve.

DETAILED DESCRIPTION OF THE INVENTION

Figure 1:
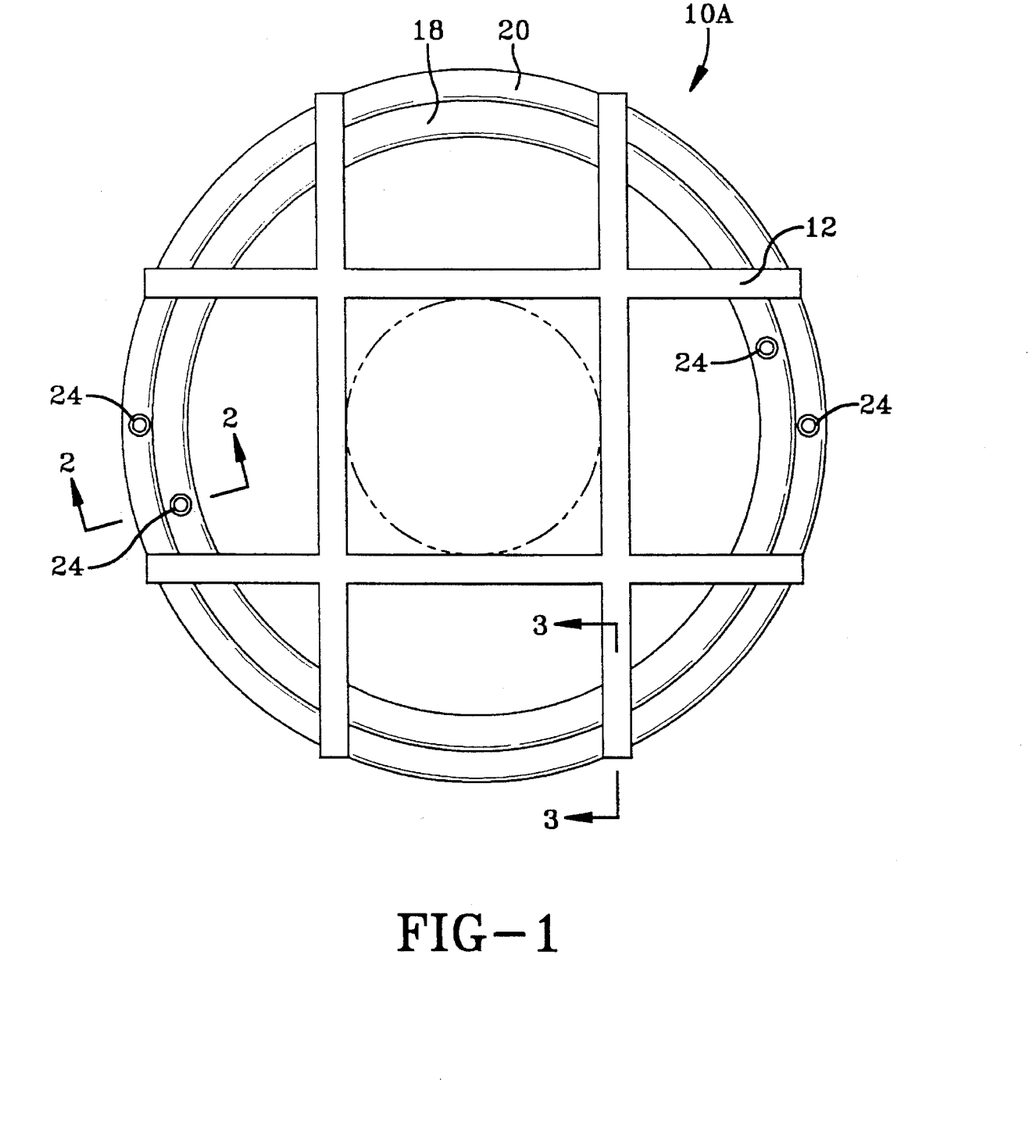
FIG. 1 is a side view of a tire inflation apparatus according to one embodiment of the invention.
Figure 2:
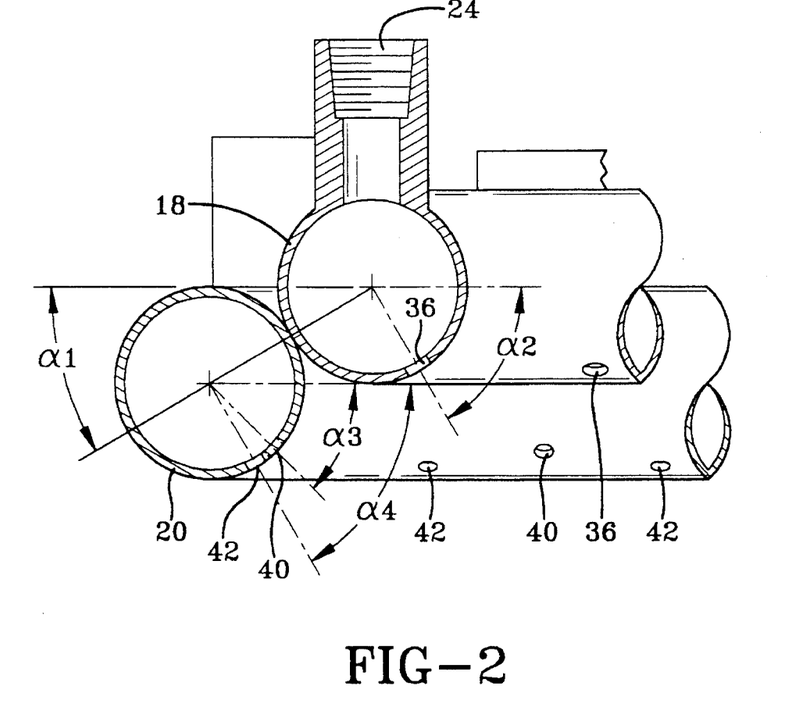
FIG. 2 is a schematic cross-sectional view of the first and second manifolds of the embodiment shown in FIG. 1.
Figure 3:
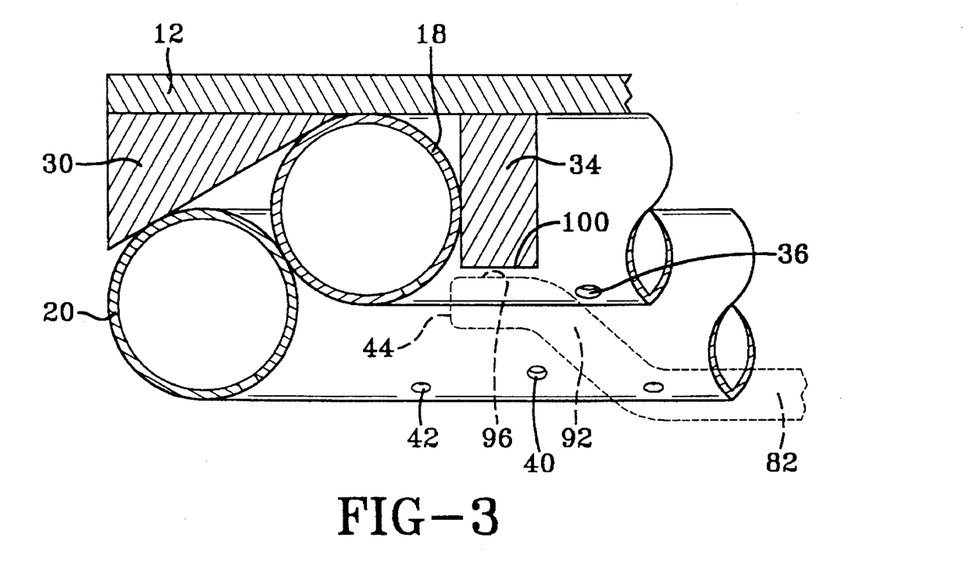
FIG. 3 is schematic cross-sectional view of the first and second manifolds, support member and centering block of one embodiment of the invention as illustrated in FIG. 1.

With reference to FIGS. 1–3, a first embodiment of tire inflation apparatus 10A according to the present invention is illustrated. The apparatus 10A includes a frame 12 and first and second annular manifolds 18,20. Each of the annular manifolds 18,20 include inlets 24. The inlets 24 on each of the manifolds 18,20 are positioned 180° from each other.

With reference to FIGS. 2 and 3, the centerline of the second annular manifold 20 is disposed so that a line joining the centerlines of the first annular manifold 18 and the second annular manifold 20 makes an angle α1 with a plane containing the first manifold 18 or a plane parallel to the frame 12. In the preferred embodiment, the angle α1 is between 20° and 40° but is preferably 30°. The second annular manifold 20 is positioned this way by means of a support member 30. The support member 30 is attached to the frame 12 and the first and second annular manifold 18,20. The first annular manifold 18 is also positioned by a centering block 34. The centering block 34 positions or centers the apparatus 10A against the wheel flange 92 as indicated in FIG. 3. The end 94 of the flange 92 abuts the exterior of the first manifold 18 while a flat surface 96 rests against a inward surface 100 of the centering block 34.

In the event of a tire having a larger nominal diameter wheel 82, the end 94 of the wheel flange 92 fits against an exterior surface of the second manifold 20 while the flat surface 96 of the wheel flange 92 fits against the bottom portion of the first annular manifold 18 as oriented in FIG. 3.

With reference to FIGS. 2 and 3, the first and second annular manifolds 18,20 include outlets in the form of holes 36. In an alternate embodiment, the outlets are in the form of nozzles (not shown). As is illustrated in FIGS. 2 and 3, the holes 36 are configured into rows.

One of the important features of the invention is the angle or direction of the holes 36. For example, with continuing reference to FIG. 2, the centerlines of holes 36 in the first annular manifold 18 are positioned at an angle of $\alpha 2$ with a plane containing the first manifold 18. It is believed the invention can be successfully practiced when $\alpha 2$ is an angle between 50° and 70° from the plane containing the first manifold 18, although it is preferred that $\alpha 2$ be equal to 60°.

With continuing reference to FIG. 2, the second annular manifold 20 includes two rows of holes 36. The centerlines of a first row of holes 40 make an angle of $\alpha 3$ with a plane parallel to the plane containing the second manifold 20 while centerlines of the second row 42 of holes 36 make an angle of $\alpha 4$ with a plane parallel to a plane containing the second manifold 20. In the preferred embodiment, $\alpha 3$ is between 40° and 50° and $\alpha 4$ is between 55° and 65°. In the preferred embodiment, $\alpha 3$ is 45° and $\alpha 4$ is 60°.

Figure 4:
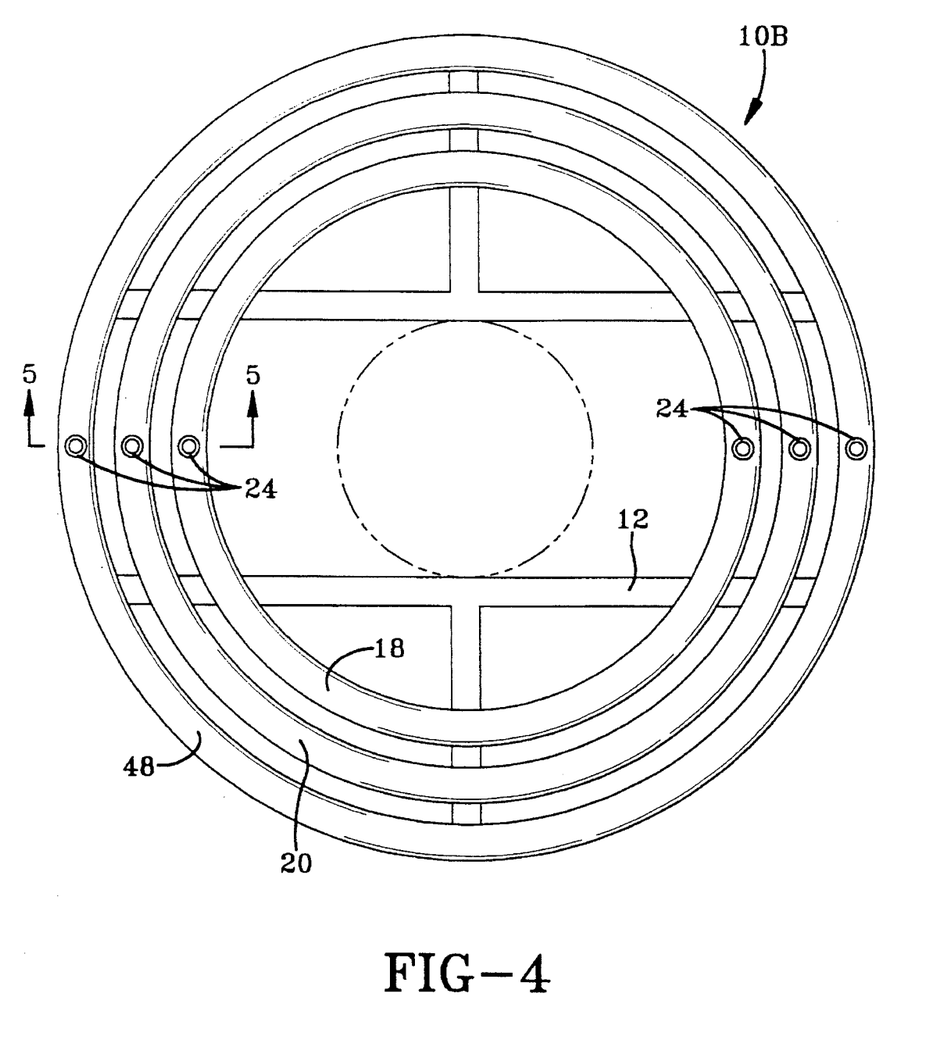
FIG. 4 is a side view of a second embodiment of the invention featuring first, second and third annular manifolds.
Figure 5:
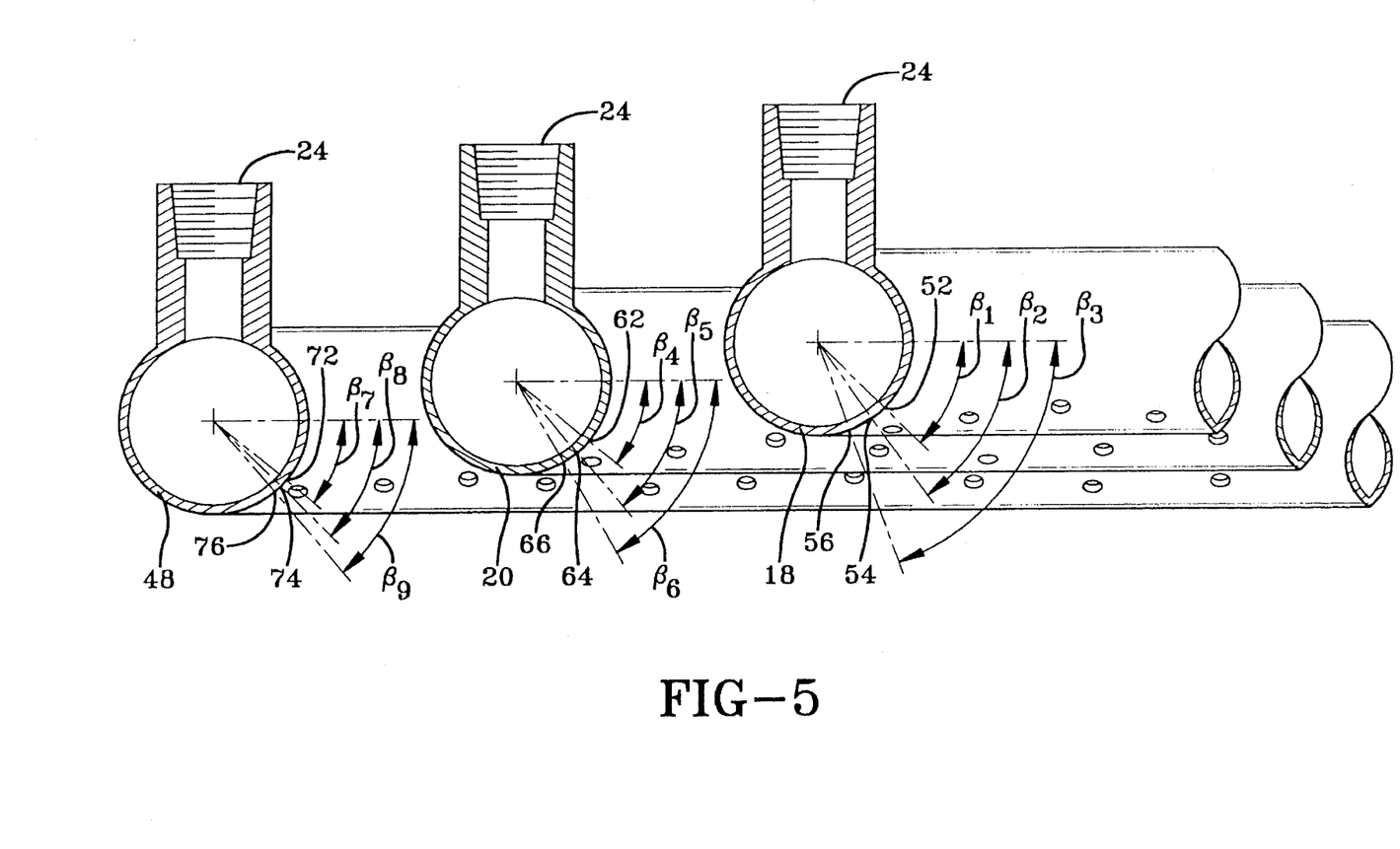
FIG. 5 is a cross-sectional view of the second embodiment of the invention taken along 5—5 of FIG. 4.

With reference to FIGS. 4 and 5, a second embodiment of the invention is disclosed. Features of this embodiment which are like those of the first embodiment shown in FIGS. 1–3 will be referred to by similar reference characters. In the embodiment shown in FIGS. 4 and 5, the apparatus 10B includes first, second, and third annular manifolds 18,20,48. The third annular manifold 48 is concentrically outwardly of the first and second annular manifolds 18,20.

With reference to FIG. 5, the first annular manifold 18 has three rows of holes 36. The centerlines of the first row 52 of holes 36 make an angle $\beta 1$ with a plane parallel to the plane containing the first manifold 18. The centerlines of the second row 54 of holes 36 makes an angle $\beta 2$ with the same plane. The centerlines of a third row 56 of holes 36 makes an angle $\beta 3$ with the same plane. Angle $\beta 1$ is between 40° and 50°, $\alpha 2$ is between 50° and 60°, and $\beta 3$ is between 65° and 75°. In the preferred embodiment, $\beta 1$ is 45°, $\beta 2$ is 55° and $\beta 3$ is 70°.

In the second annular manifold 20, the centerlines of a first row 62 of holes 36 make an angle $\beta 4$ with a plane containing the second manifold 20. The centerlines of a second row 64 of holes 36 make an angle $\beta 5$ with the same plane. The centerlines of a third row 66 of holes 36 make an angle $\beta 6$ for the same plane. The invention is best practiced when $\beta 4$ is between 35° and 45°, $\beta 5$ is between 45° and 55° and $\beta 6$ is between 55° and 65°. In the preferred embodiment, $\beta 4$ is 40°, $\beta 5$ is 50°, and $\beta 6$ is 60°.

In the third annular manifold 48, the centerlines of a first row 72 of holes 36 make an angle $\beta 7$ with a plane containing the third annular manifold 48 while the centerlines of a second row 74 of holes 36 make an angle $\beta 8$ with the same plane and the centerlines of a third row 76 of holes 36 make an angle $\beta 9$ with the same plane. The invention works best when $\beta 7$ is between 35° and 45°, $\beta 8$ is between 40° and 50° and $\beta 9$ is between 45° and 55°. In the preferred embodiment, $\beta 7$ is 40°, $\beta 8$ is 45° and $\beta 9$ is 50°.

In the preferred embodiment, the first annular manifold 18 has twenty-four holes 36 approximately 4.8 inches apart. In the second row 54, the first annular manifold 18 has twenty-four holes 36 approximately 4.8 inches apart. In the third row 56, twenty-four holes are again spaced 4.8 inches apart. The hole location is staggered between rows as is illustrated in FIG. 5.

For the second annular manifold 20, the first and third rows 62,66 of holes 36 each have twenty-four holes approximately 5.8 inches apart. The second row 64 of holes 36 includes forty-eight holes of approximately 2.9 inches apart.

For the third annular manifold 48, the second row 74 has forty-eight holes 36 approximately 3.45 inches apart while the first and third rows 72,76 have twenty-four holes approximately 6.9 inches apart. The hole 36 location is staggered between the rows 72,74,76.

In each case, the diameters of the holes 36 are 0.25 inches. In an alternate embodiment, the outlets are not holes but are nozzles (not shown).

The first annular manifold 18 is used to mount tires having nominal bead diameters between 24 inches and 34 inches. The second annular manifold 20 is used to mount tires having nominal bead diameters between 38 inches and 42 inches. The third annular manifold 48 is used to mount tires having nominal bead diameters between 46 inches and 54 inches.

Figure 6:
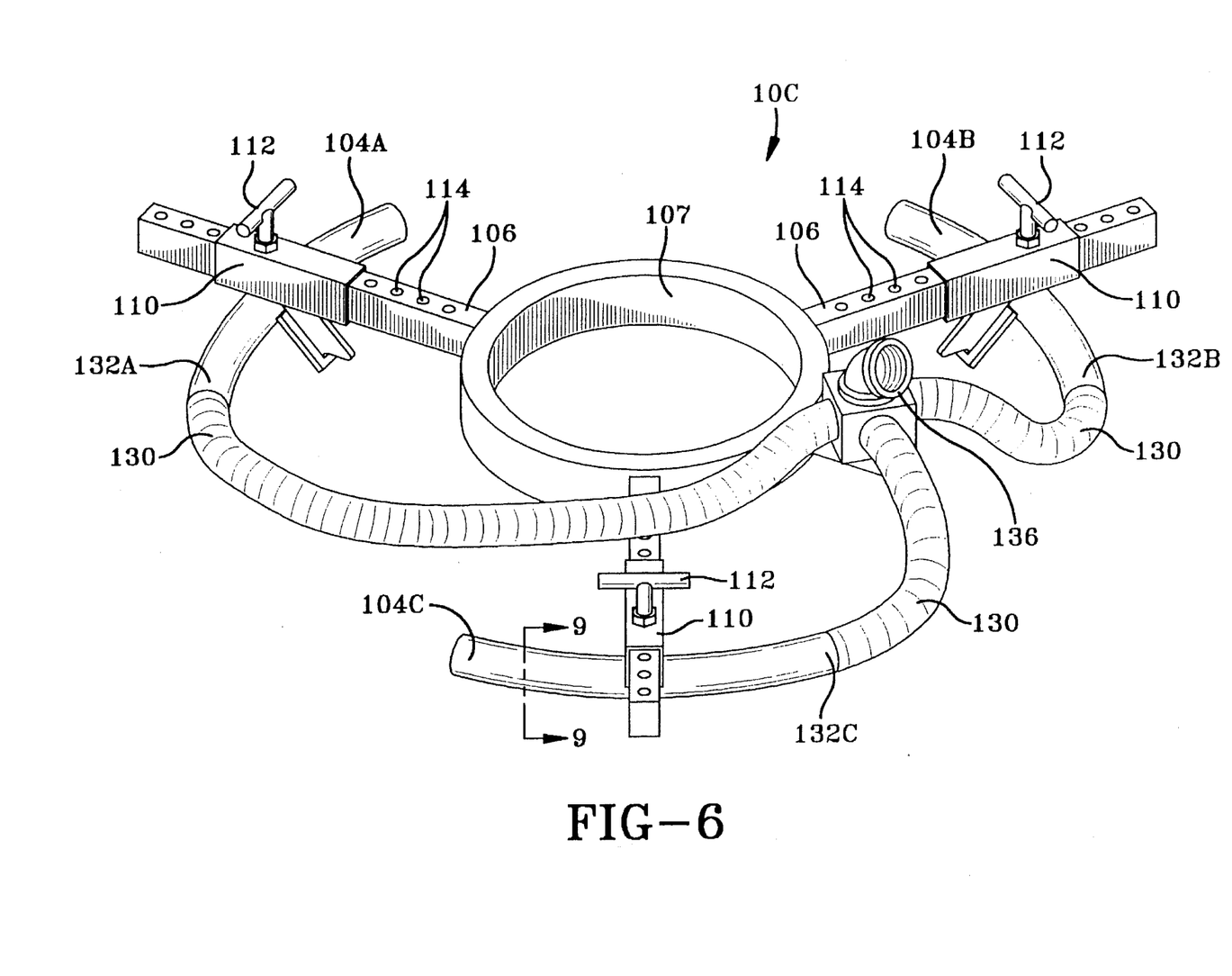
FIG. 6 is a perspective view of a tire inflation apparatus according to a third and preferred embodiment of the invention.

With reference to FIG. 6, a third and preferred embodiment of the inventive tire inflation apparatus 10C is shown. In this embodiment, a single annular manifold 104 is segmented into three arcuate sections 104A,104B,104C. The segments 104A,104B,104C are slidable radially inwardly and outwardly along slides 106 which are connected to a center ring 107. The segments 104A,104B,104C, create an annular manifold having an expandable or retractable internal diameter in the range of 24 inches to at least 56 inches.

Figure 7:
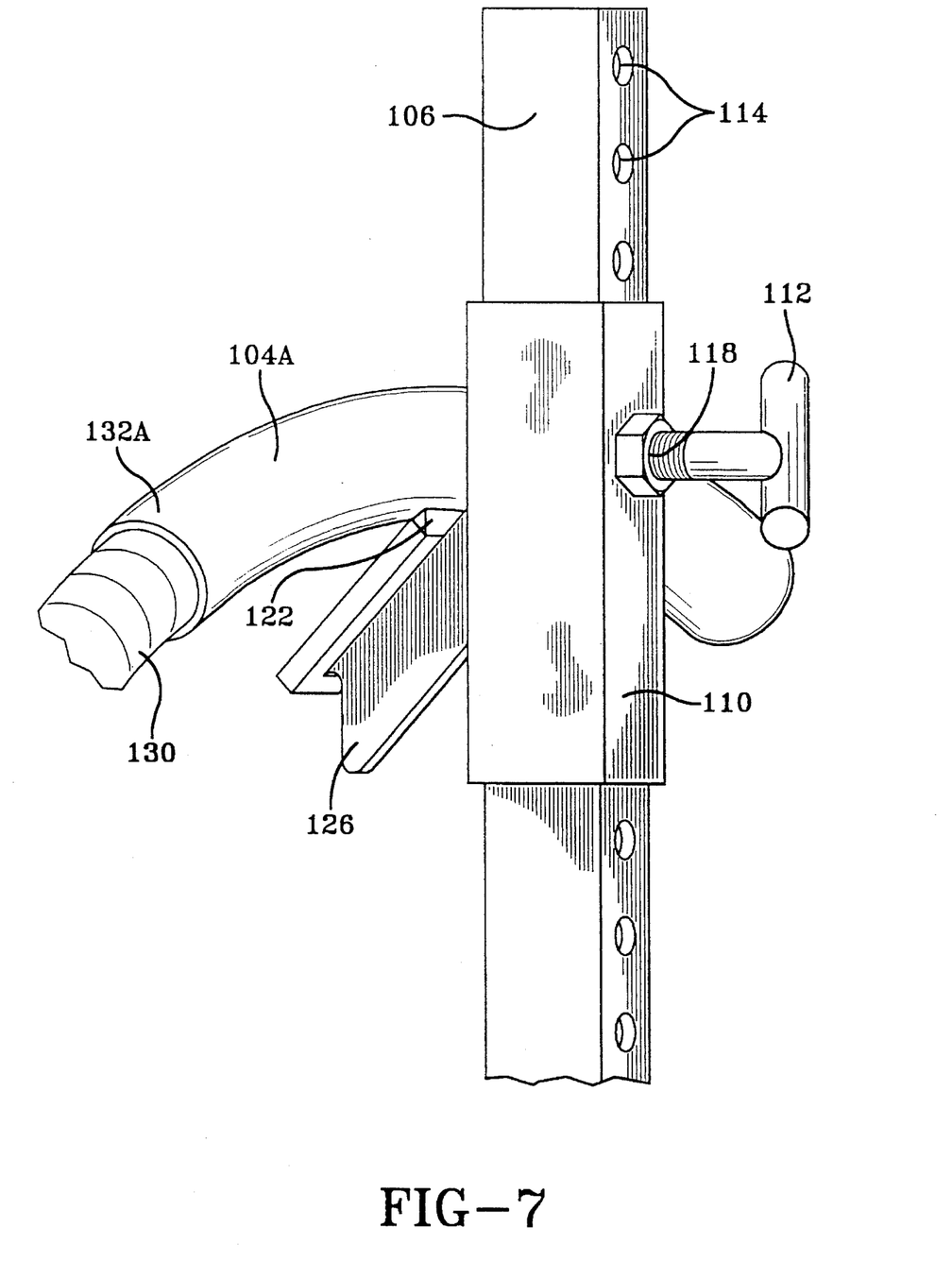
FIG. 7 is an enlarged view of a collar and slide portion of the inflation apparatus as illustrated in FIG. 6.

With reference to FIGS. 6 and 7, the slides 106 include a slidable collar 110 which can be secured to various locations along the slide 106 through hand crank 112. Hand crank 112 can be rotated to insert a screw (not shown) into holes 114 along the length of the slide 106 and thereby secure the manifold segment 104A,104B,104C at a particular location along the slide 106. In addition, a conventional bolt and nut fastener 118 can be inserted into an appropriate hole 114 to further secure the location of a collar 110 along slide 106. The manifold segments 104A,104B,104C are secured to the collar 110 via conventional fastening means. In the embodiment shown in FIG. 7, this fastening is accomplished by means of weld 122.

Also attached to collar 110 is centering member 126. In this embodiment, the centering member 126 rests against the wheel flange (not shown) to properly center the manifold segments 104A,104B,104C in proper location.

Figure 8:
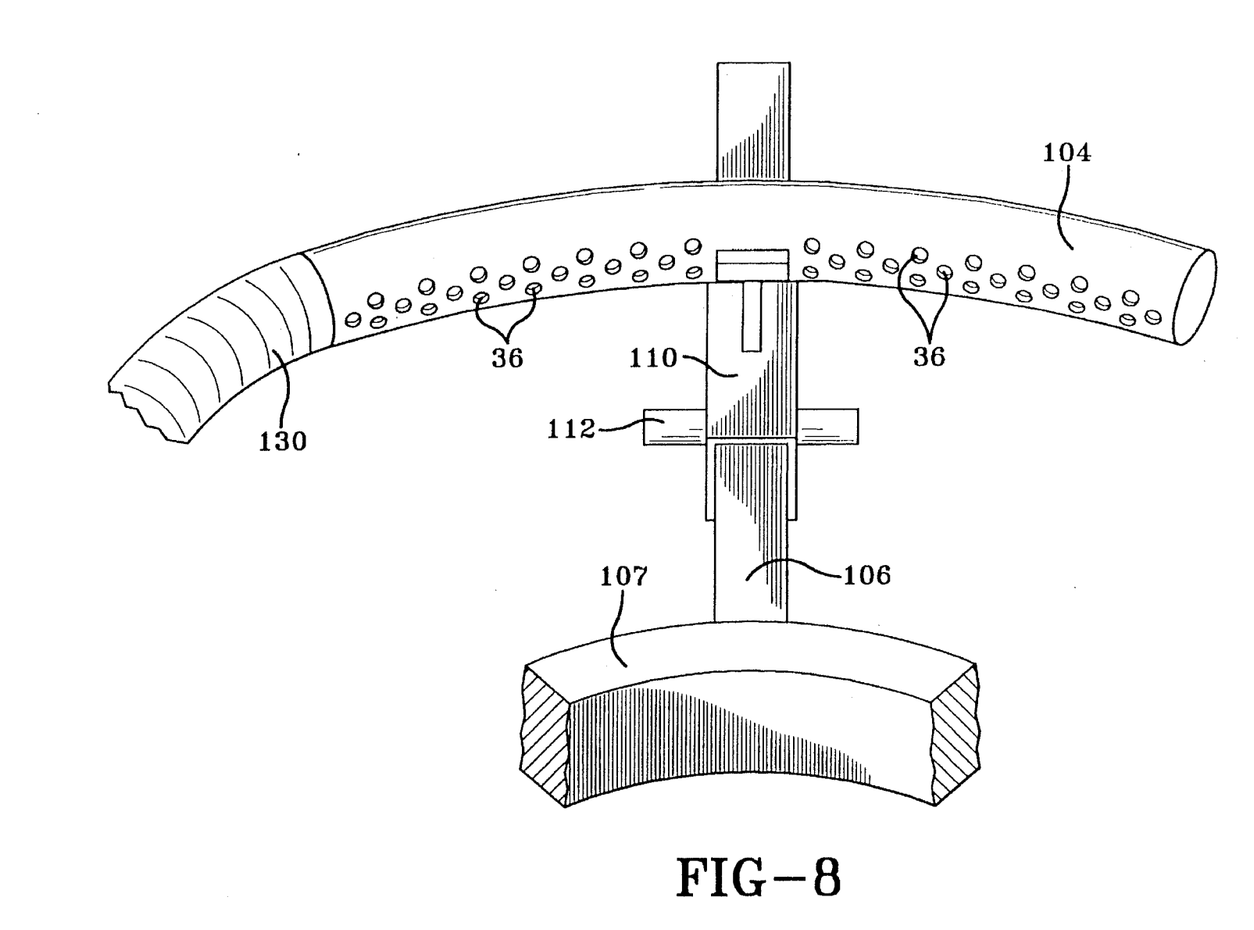
FIG. 8 is an enlarged view of one of the manifold segments and the holes therein.

With reference to FIGS. 6 and 8, the third embodiment of the apparatus 10C also includes hoses 130. One end of the each hose 130 is attached to an end 132A,132B,132C of the manifold segments 104A,104B,104C and the other end of the hose 130 is connected to an inlet manifold 136. The open end of the inlet manifold 136 is threaded so that it can be screwed onto a source of pressurized gas. When a source (not shown) of pressurized gas is fitted to the inlet manifold 136, the pressurized gas can spread throughout each of the hoses 130 and into the manifold segments 104A,104B,104C, eventually exiting the holes 36 in the manifold segments 104A,104B,104C. The flexibility of the hoses 130, when coupled with the slidability of the collars 110 enable the third embodiment of the inventive apparatus 10C to be effective inflating and mounting tires with nominal bead diameters from 24 inches to 54 inches.

Figure 9:
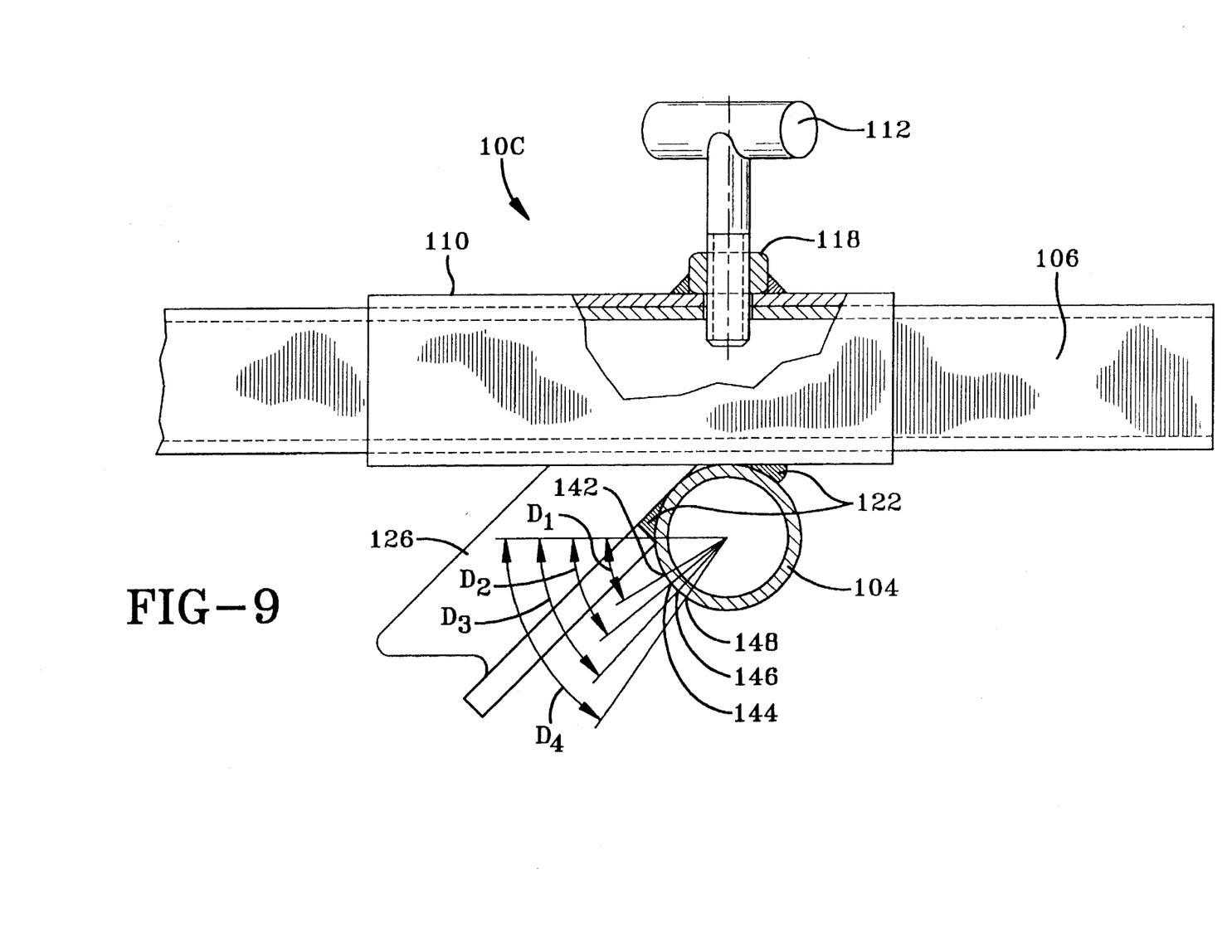
FIG. 9 is a cross-sectional view taken along lines 9—9 of FIG. 6.

With reference to FIG. 9, a schematic cross-sectional view of the third embodiment of the apparatus 10C is shown. In this embodiment, each of the segments 104A,104B,104C of the manifold 104 includes four rows of holes 36. The centerlines of the first row 142 of holes 36 make an angle D1 with a plane parallel to or containing the manifold 104. The centerlines of the holes 36 in the second row 144 make an angle D2 with the same plane while the centerlines of the holes in the third row 146 make an angle D3 and the centerlines of the holes 36 in the fourth row 148 make an angle of D4 with the same plane. The invention operates best when D1 is between 45° and 55°, D2 is between 50° and 60°, D3 is between 55° and 65° and D4 is between 60° and 70°. In the preferred embodiment, D1 is 50°, D2 is 55°, D3 is 60° and D4 is 65°.

Figure 10:
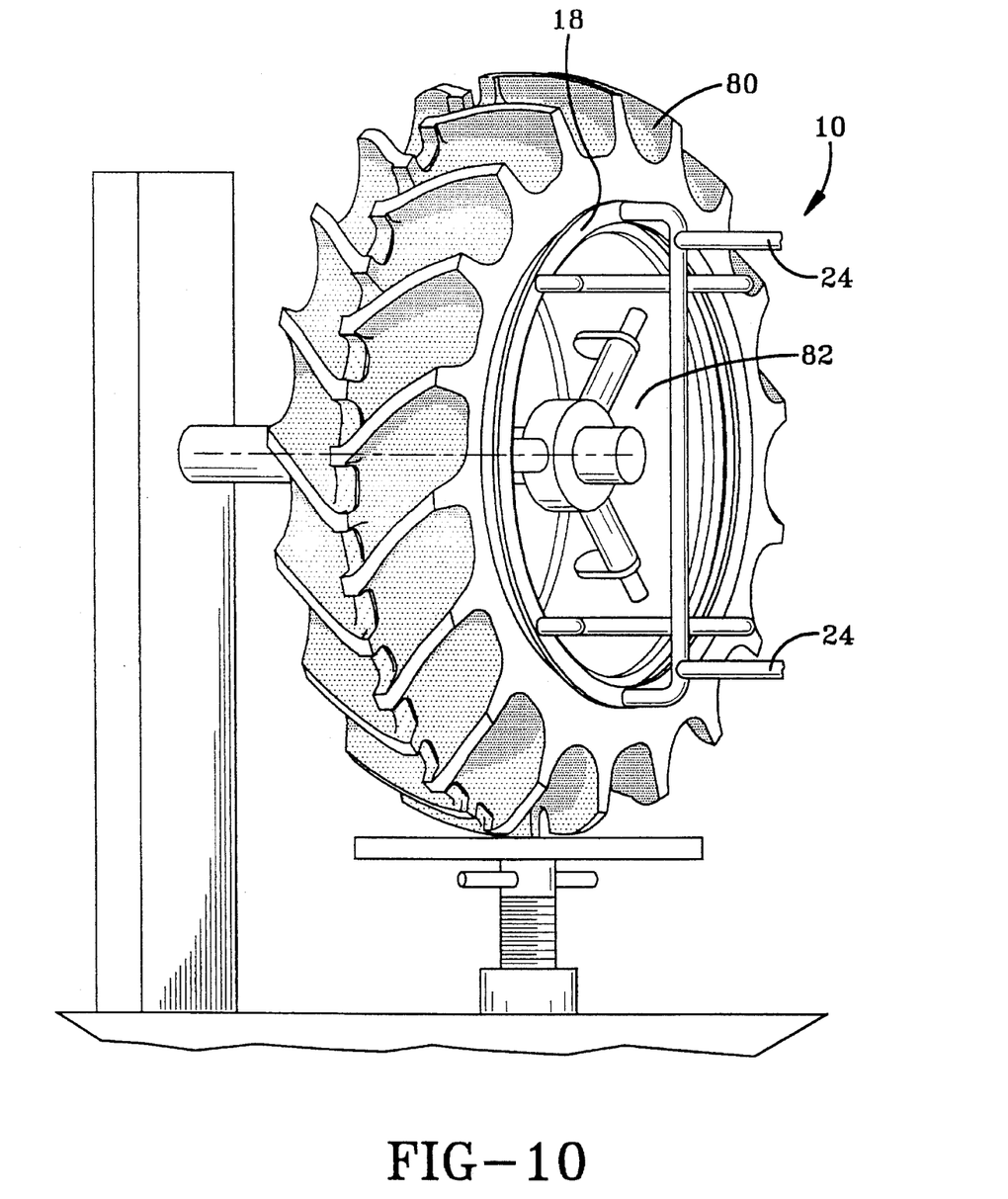
FIG. 10 is a schematic illustration of a inflation system as utilized with the inventive inflating apparatus.

With reference to FIG. 10, the inventive apparatus 10 is shown in relation to a tire 80 and wheel 82. The centering block 34 (not shown) or the centering member 126 (not shown) is pressed against the wheel 82 so that the axial centerlines of whatever manifold 18,20,48,104 is being used is aligned with the axial centerline of the tire 80 and wheel 82.

A method for inflating the tire 80 will be described. The uninflated tire 80 is mounted onto wheel 82 in the conventional way. This often involves depressing one of the tires beads into a well (not shown) in the wheel 82. When the uninflated tire 80 is mounted onto the wheel 82, the tire valve (not shown) is connected to a first source of pressurized air (not shown). Depending on the size of the tire and which of the embodiments of the invention is being utilized, one of the arcuate manifolds is positioned against the tire sidewall. The inflation apparatus 10 is centered against the lateral flange 92 of the wheel 82 by centering block 34. Next the tire 80 is inflated with a surge of pressurized gas, such as air, which passes from the source of pressurized gas into the arcuate manifold 18,20,48,104 and out the holes 36. In the preferred embodiment, this surge of pressurized air is released at a pressure between 30 psi and 130 psi. In the past, significantly higher pressures were necessary to mount such tires. These higher pressures were more expensive and more difficult to work with. Because of the efficient and accurate way the present invention directs pressurized air due to the angle holes in the manifolds, tires 80 can be successfully mounted at lower pressures. Due to the angled centerlines of the holes 36, the air performs two important functions to assist in the mounting and seating of the tire beads against the wheel flange 92. First, the direction of the air exiting the manifold is such that it forces the tire beads against the wheel flange, more quickly causing the tire beads to seal against the wheel. Second, the air acts as an air curtain, preventing the air surging into the tire cavity from exiting the tire cavity underneath the bead. Once the tire beads have sealed against the wheel, the tire continues to inflate through the tire valve up to normal operating pressure.

The invention has been described with reference to a preferred embodiment. Obviously, modifications and alternations will occur to others upon a reading and understanding of this specification. It is intended to include all such modifications and alternations in so far as they come within the scope of the appended claims or the equivalence thereof.

Having thus described the invention, it is now claimed:

1. An apparatus for inflating tubeless tires on a wheel, said apparatus comprising:

a first annular manifold generally lying in a first center plane, the manifold having an inlet and a plurality of outlets therein, the outlets being arranged into a first row and a second row, each of the outlets of the first row having a centerline making a first angle between 40° and 50° with the first center plane, each of the outlets of the second row having a centerline making a second angle between 50° and 60° with the first center plane.

2. An apparatus for inflating tubeless tires on a wheel, said apparatus comprising:

a first annular manifold generally lying in a first center plane, the manifold having an inlet and a plurality of outlets, one of the outlets having a centerline making an angle between 40° and 75° with the first center plane; and, a second annular manifold, the second annular manifold being concentrically outward of the first annular manifold, the second annular manifold generally lying in a second center plane, the second annular manifold having an inlet and a plurality of outlets, one of the outlets having a centerline which makes an angle between 35° and 65° with the second center plane.

3. The apparatus of claim 2 wherein the apparatus further comprises:

a third annular manifold, the third annular manifold being concentrically outward of the first and second annular manifolds, the third annular manifold generally lying in a third center plane, the third annular manifold having an inlet and a plurality of outlets, one of the outlets in the third annular manifold having a centerline which makes an angle between 35° and 55° with the third center plane.

4. The apparatus of claim 2 wherein each of the first and second manifolds comprise a first inlet spaced away from a second inlet.

5. The apparatus of claim 1 wherein the outlets of the first manifold are further arranged into a third row.

6. The apparatus of claim 1 wherein the outlets in the first row are staggered from the outlets in the second row.

7. The apparatus of claim 5 wherein the outlets in the second row are between 2 and 4 inches apart and the outlets in the first and third rows are between 5 inches and 7 inches apart.

8. The apparatus of claim 1 wherein the outlets in the first annular manifold are holes, the holes having a diameter between 0.125 inches and 0.35 inches.

9. The apparatus of claim 1 wherein each of the outlets in the first and second rows are holes, the holes being between 4 and 5 inches apart from each other.

10. The apparatus of claim 2 further comprising:

a frame, the frame being attached to the first manifold;

a support member, the support member being connected to the first and second manifold and positioning the second manifold away from the frame.

11. The apparatus of claim 1 further comprising:

a frame, the frame being attached to the first manifold;

a centering block, the centering block being connected to the frame and the first manifold and positioning the first manifold relative to an associated tire so that an axis of the first manifold is aligned with an axis of the associated tire.

12. The apparatus of claim 10 wherein a line through the centerlines of the first and second manifolds makes an angle α1 between 20° and 40° with a plane containing the first manifold.

13. An apparatus for inflating tubeless tires on a wheel, said apparatus comprising:

a first annular manifold having a first center plane, an inlet and a plurality of outlets, one of the outlets having a centerline making an angle between 40° and 75° with the first center plane;

a second annular manifold, the second annular manifold being concentrically outward of the first annular manifold, the second annular manifold having a second center plane, an inlet and a plurality of outlets, one of the outlets having a centerline making an angle between 35° and 65° with the second center plane;

a third annular manifold, the third annular manifold being concentrically outward of the first and second annular manifolds, the third annular manifold having a third center plane, an inlet and a plurality of outlets, one of the outlets having a centerline making an angle between 35° and 55° with the third center plane; the outlets in the first, second and third annular manifold are configured into first, second and third rows of holes, the holes in the first and third rows are staggered from the holes in the second row, the holes in the second row are between 2 and 4 inches apart and the holes in the first and third rows are between 5 inches and 7 inches apart, the holes having a diameter between 0.125 inches and 0.5 inches;

a frame, the frame being attached to the first manifold;

a support member, the support member being connected to the first and second manifold and positioning the second manifold away from the frame; and, a centering block, the centering block being connected to the frame and the first manifold and positioning the first manifold relative to an associated tire so that an axis of the first manifold is aligned with an axis of the associated tire.

14. An apparatus for inflating tubeless tires on a wheel, said apparatus comprising:

a manifold for passing pressurized gas therethrough, the manifold comprising at least two arcuate segments, each arcuate segment having a plurality of holes therein, the holes being arranged into first and second rows, the centerlines of holes in the first row making a first angle between 45° and 55° with a plane containing the manifold and the centerlines of the holes in the second row making a second angle between 50° and 60° with the plane containing the manifold.

15. The apparatus of claim 14 wherein the manifold further comprises:

a third row of holes, the centerlines of the holes in the third row making a third angle between 55° and 65° with the plane containing the manifold.

16. The apparatus of claim 15 wherein the manifold further comprises:

a fourth row of holes, the centerlines of the holes in the fourth row making a fourth angle between 60° and 70° with the plane containing the manifold.

17. An apparatus for inflating tubeless tires on a wheel comprising:

a center ring;

a plurality of slides; the slides being attached to the center ring and radiating outwardly therefrom;

an inlet manifold, the inlet manifold having a first opening therein for the intake of pressurized gas;

a plurality of arcuate segments lying in a plane, each of the arcuate segments having a plurality of holes therein for expelling pressurized gas, each of the segments being slidably attached to one of the slides; and, a plurality of hoses, each of said hoses being attached at one end to the inlet manifold and attached at the other end to one of the arcuate segments, the hoses being able to transfer pressurized gas from the inlet manifold to the arcuate segments.

18. The apparatus of claim 17 wherein the holes of each arcuate segments are arranged into first, second and third rows, the centerlines of the holes in the first rows making a first angle between 45° and 55° with the plane containing the arcuate segments, the centerlines of the holes in the second rows making a second angle between 50° and 60° with the plane containing the arcuate segments, and the centerlines of the holes in the third rows making a third angle between 55° and 65° with the plane containing the arcuate segments.

19. The apparatus of claim 17 wherein the arcuate segments are slidable on the slides to accommodate tires having nominal bead diameters from 24 to 54 inches.

* * * * *